United States Patent
Masuda et al.

(10) Patent No.: US 10,481,252 B2
(45) Date of Patent: Nov. 19, 2019

(54) SENSOR DEVICE AND LIGHTING DEVICE

(71) Applicant: Panasonic Intellectual Property Management Co., Ltd., Osaka (JP)

(72) Inventors: Tatsuo Masuda, Osaka (JP); Tadashi Murakami, Osaka (JP); Shigeo Gotoh, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 322 days.

(21) Appl. No.: 15/602,965

(22) Filed: May 23, 2017

(65) Prior Publication Data

US 2017/0343663 A1 Nov. 30, 2017

(30) Foreign Application Priority Data

May 26, 2016 (JP) ................. 2016-105635

(51) Int. Cl.
| | |
|---|---|
| *G01S 13/56* | (2006.01) |
| *G01S 7/35* | (2006.01) |
| *G01S 13/86* | (2006.01) |
| *G01S 13/88* | (2006.01) |
| *F21V 23/04* | (2006.01) |
| *F21V 33/00* | (2006.01) |
| *F21Y 115/10* | (2016.01) |

(52) U.S. Cl.
CPC ............. *G01S 13/56* (2013.01); *G01S 7/352* (2013.01); *G01S 13/86* (2013.01); *G01S 13/88* (2013.01); *F21V 23/0471* (2013.01); *F21V 33/006* (2013.01); *F21Y 2115/10* (2016.08); *G01S 2007/358* (2013.01)

(58) Field of Classification Search
CPC .......... G01S 13/56; G01S 13/88; G01S 13/86; G01S 7/352; G01S 2007/358; F21Y 2115/10; F21V 33/006; F21V 23/0471
USPC .......................................................... 342/28
See application file for complete search history.

(56) References Cited

U.S. PATENT DOCUMENTS

| | | | | | |
|---|---|---|---|---|---|
| 5,570,093 | A | * | 10/1996 | Aker ...................... | G01S 7/003 342/104 |
| 6,121,917 | A | * | 9/2000 | Yamada ................ | G01S 13/345 342/104 |
| 6,437,729 | B1 | * | 8/2002 | Mattox ................... | G01S 13/58 342/106 |

(Continued)

FOREIGN PATENT DOCUMENTS

JP 2014-219249 A 11/2014

*Primary Examiner* — Frank J McGue
(74) *Attorney, Agent, or Firm* — McDermott Will & Emery LLP

(57) ABSTRACT

A sensor device includes a radio wave sensor and a signal processor. The signal processor includes an identifier and a noise remover configured to remove, from a second sensor signal, at least one frequency component determined as a noise component by the identifier. The identifier compares a signal intensity of each of the frequency components with one or more signal intensities of other frequency components. When a signal intensity of a first frequency component is greater than signal intensities of one or more second frequency components located in the vicinity of the first frequency component by an extent exceeding a threshold range, the identifier determines the first frequency component as the noise component.

18 Claims, 5 Drawing Sheets

(56) References Cited

U.S. PATENT DOCUMENTS

| | | | |
|---|---|---|---|
| 7,187,321 B2* | 3/2007 | Watanabe | G01S 13/345 342/118 |
| 7,538,720 B2* | 5/2009 | Pillai | G01S 7/282 342/159 |
| 2010/0245152 A1* | 9/2010 | Krikorian | G01S 7/415 342/28 |
| 2016/0195606 A1* | 7/2016 | Sugino | G01S 13/56 342/195 |

* cited by examiner

SENSOR DEVICE AND LIGHTING DEVICE

CROSS-REFERENCE TO RELATED APPLICATION

The present application is based upon and claims the benefit of priority of Japanese Patent Application No. 2016-105635, filed on May 26, 2016, the entire contents of which are incorporated herein by reference.

TECHNICAL FIELD

The present disclosure relates to sensor devices and lighting devices, and more specifically to a sensor device configured to transmit a radio wave and to receive the radio wave reflected off an object to sense the presence of the object and a lighting device including the sensor device.

BACKGROUND ART

In order to save energy, a known lighting device is configured to turn off a light source when a sensor device senses the presence of a person and to turned off (or dim) the light source when the sensor device does not sense the presence of a person. Document 1 (JP 2014-219249 A) describes an example of such a sensor device. The sensor device described in Document 1 includes a radio wave sensor formed as a Doppler sensor and a signal processor configured to perform signal processing on a sensor signal output from the radio wave sensor. The radio wave sensor (Doppler sensor) outputs a sensor signal having a frequency equal to a frequency difference between a transmission wave and a reflection wave to the signal processor. The frequency of the sensor signal has a value equal to a frequency proportional to a movement speed of an object which reflects off the radio wave (e.g., the speed at which a person walks) and an vibration frequency of an object staying at one position and vibrating. The signal processor converts (performs orthogonal transformation of) the sensor signal, which is a signal in a time domain, into a signal of a frequency domain. The signal processor presumes a noise component (background signal) which steadily appears among noise components included in the sensor signal. Then, the signal processor removes the background signal, which is presumed, from the sensor signal, thereby improving the sensing accuracy of a sensing target object (e.g., a moving person).

The sensor device is required to improve the sensing accuracy with a relatively simple process. However, in the sensor device described in Document 1, it has been difficult to simplify the signal processing of a signal processor while improving the sensing accuracy.

SUMMARY

One of the objectives of the present disclosure is to provide a sensor device and a lighting device which is capable of simplifying the signal processing while improving the sensing accuracy.

A sensor device according to one aspect of the present disclosure includes a radio wave sensor configured to transmit a radio wave and to receive a reflection wave which is the radio wave reflected off and returning from an object, and to output a sensor signal containing frequency components proportional to a movement speed of the object. The sensor device further includes a signal processor configured to perform signal processing on the sensor signal output from the radio wave sensor and to determine whether or not the object is a sensing target object. The signal processor includes a signal converter configured to convert the sensor signal which is a first sensor signal of a time domain into a second sensor signal of a frequency domain. The signal processor includes a recognition processor configured to determine whether or not the object is the sensing target object based on a distribution of signal intensities showing magnitudes of frequency components of the second sensor signal, and an identifier configured to determine whether or not each of the frequency components is a noise component. The signal processor includes a noise remover configured to remove, from the second sensor signal, at least one of the frequency components which is determined as the noise component by the identifier. The identifier compares a signal intensity of each of the frequency components of the second sensor signal with one or more signal intensities of other frequency components of the second sensor signal. When a signal intensity of at least one frequency component of the frequency components is greater than signal intensities of one or more vicinity frequency components which are located in a vicinity of the at least one frequency component by an extent exceeding a threshold range, the identifier determines the at least one frequency component as the noise component.

The lighting device according to one aspect of the present disclosure includes the sensor device according to the one aspect and a lighting fixture. A lit state of the lighting fixture changes in accordance with a sensing result of the sensing target object by the sensor device.

A sensor device according to one aspect of the present disclosure includes a radio wave sensor configured to transmit a radio wave and to receive a reflection wave which is the radio wave reflected off and returning from an object, and to output a sensor signal containing frequency components proportional to a movement speed of the object. Moreover, the sensor device includes a signal processor; and a memory storing a program. The program, when executed by the signal processor, causes the signal processor to perform: converting the sensor signal which is a first sensor signal of a time domain into a second sensor signal of a frequency domain; determining whether or not the object is a sensing target object based on a distribution of signal intensities showing magnitudes of frequency components of the second sensor signal; determining whether or not each of the frequency components of the second sensor signal is a noise component by comparing a signal intensity of at least one frequency component of the second sensor signal with a value calculated from the signal intensities of one or more vicinity frequency components of the second sensor signal, the one or more vicinity frequency components being located in a vicinity of the at least one frequency component; and removing, from the second sensor signal, one or more of the frequency components which is determined as the noise component.

A sensor device according to one aspect of the present disclosure includes a radio wave sensor configured to transmit a radio wave and to receive a reflection wave which is the radio wave reflected off and returning from an object, and to output a sensor signal containing frequency components proportional to a movement speed of the object. Moreover, the sensor device includes a signal processor. The signal processor is configured to convert the sensor signal which is a first sensor signal of a time domain into a second sensor signal of a frequency domain. The signal processor is configured to determine whether or not the object is a sensing target object based on a distribution of signal intensities showing magnitudes of frequency components of the second sensor signal. The signal processor is configured to determine whether or not each of the frequency components of the second sensor signal is a noise component by comparing a signal intensity of at least one frequency component of the second sensor signal with a value calculated from the signal intensities of one or more vicinity frequency components of the second sensor signal, the one or more vicinity frequency components being located in a vicinity of the at least one frequency component. The signal processor is configured to remove, from the second sensor signal, one or more of the frequency components which is determined as the noise component.

BRIEF DESCRIPTION OF THE DRAWINGS

The figures depict one or more implementation in accordance with the present teaching, by way of example only, not by way of limitations. In the figures, like reference numerals refer to the same or similar elements.

DETAILED DESCRIPTION

A sensor device and a lighting device according to one embodiment of the present disclosure will be described below in detail with reference to the drawings. Note that the configurations described in the following embodiments are mere examples of the present disclosure, and the present disclosure is not limited to the following embodiments. Various modifications may be made depending on design, and the like as long as the one or more effects of the present disclosure are provided.

Figure 1:
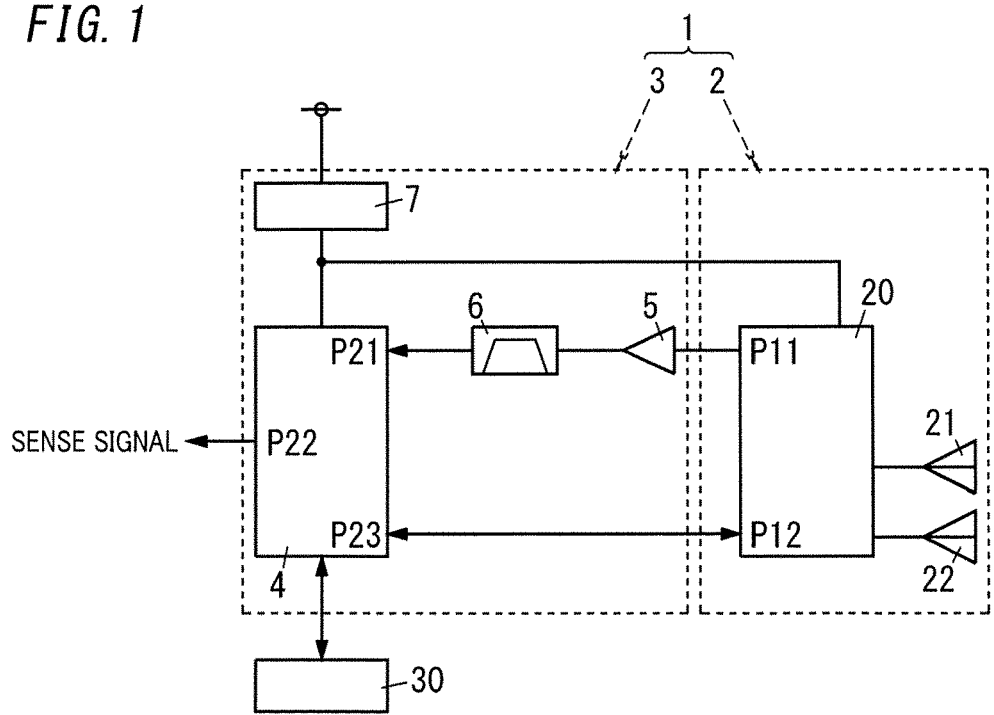
FIG. 1 is a block diagram illustrating a sensor device according to one embodiment of the present disclosure.

As illustrated in FIG. 1, a sensor device 1 of the present embodiment includes a radio wave sensor 2 and a signal processor 3. The radio wave sensor 2 includes a high frequency circuit 20, a transmission antenna 21, and a reception antenna 22 as main components. However, the radio wave sensor 2 may include components other than the high frequency circuit 20, the transmission antenna 21, and the reception antenna 22 as necessary. The high frequency circuit 20 generates a transmission signal having a reference frequency and outputs the transmission signal which has been generated to the transmission antenna 21. The transmission signal is, for example, a non-modulated Continuous Wave signal in the 24 GHz band. The transmission antenna 21 transmits the transmission signal output from the high frequency circuit 20 as radio waves having reference frequencies (specified frequencies within a range of 24.05 to 24.25 [GHz]). The reception antenna 22 receives, among the radio waves transmitted from the transmission antenna 21, a radio wave (a reflection wave) reflected off and returning from an object (including both a moving object and a stationary object) and outputs a reception signal. Here, the frequency of the reflection wave reflected off a moving object is shifted by a frequency (hereinafter referred to as a Doppler frequency) proportional to the movement speed of the object. However, the frequency of a reflection wave reflected off an object staying at one position and vibrating is also shifted by the Doppler frequency which is equal to the vibration frequency of the object.

The high frequency circuit 20 mixes the reception signal output from the reception antenna 22 with the transmission signal, thereby generating a beat signal having a frequency equal to the Doppler frequency. The beat signal is a signal of a time domain, and when moving objects and objects each staying at one position and vibrating are present, the beat signal includes frequency components equal to frequencies each proportional to the movement speed of a corresponding one of the moving objects and vibration frequencies of the objects each staying at one position and vibrating. The high frequency circuit 20 uses an IQ-phase detector to generate two beat signals (I-phase and Q-phase beat signals) having phases different from the reception signal by $\eta/2$ and outputs the I-phase beat signal as a first sensor signal from an output port P11. Note that the high frequency circuit 20 may output a Q-phase beat signal as the first sensor signal instead of the I-phase beat signal, or the high frequency circuit 20 may output two beat signals, the I-phase and Q-phase beat signals, as first sensor signals.

The signal processor 3 includes a microcontroller 4, an amplifier 5 configured to amplify the first sensor signal, a bandpass filter 6 configured to restrict the frequency band of the first sensor signal amplified by the amplifier 5, and a control power supply circuit (regulator) 7. The bandpass filter 6 allows passage of frequency components in a frequency band including frequency components proportional to the movement speed of an object which is a sensing target, the frequency components in the frequency band being included in frequency components of the first sensor signal which is a signal of the time domain. The sensor device 1 targets people as the sensing target. In general, the movement speed at which a person walks on a flat ground or goes up or down stairs is about 1 to 6 [km/h]. Therefore, the passing range of the bandpass filter 6 is at least within a range of about 40 [Hz] to about 300 [Hz]. The control power supply circuit 7 includes, for example, a three-terminal regulator and forms an operation power supply of the radio wave sensor 2 and an operation power supply of the signal processor 3.

The microcontroller 4 performs A/D conversion on the first sensor signal, which is an analog signal, input to an A/D input port P21. When a moving object is identified as a person, the microcontroller 4 outputs a sense signal from an output port P22. Moreover, the microcontroller 4 has a communication port P23 electrically connected to a communication port P12 of the high frequency circuit 20. These communication ports P12 and P23 are ports which are used to perform bidirectional serial communication and which conform to Serial Peripheral Interface (SPI) as a specification of serial communication. For example, the microcontroller 4 transmits a sensing start command and a sensing stop command from the communication port P23. Upon receiving the sensing start command via the communication port P12, the high frequency circuit 20 generates a transmission signal and starts transmitting a radio wave. Upon receiving the sensing stop command via the communication port P12, the high frequency circuit 20 stops generating the transmission signal and stops transmitting the radio wave.

Figure 2:
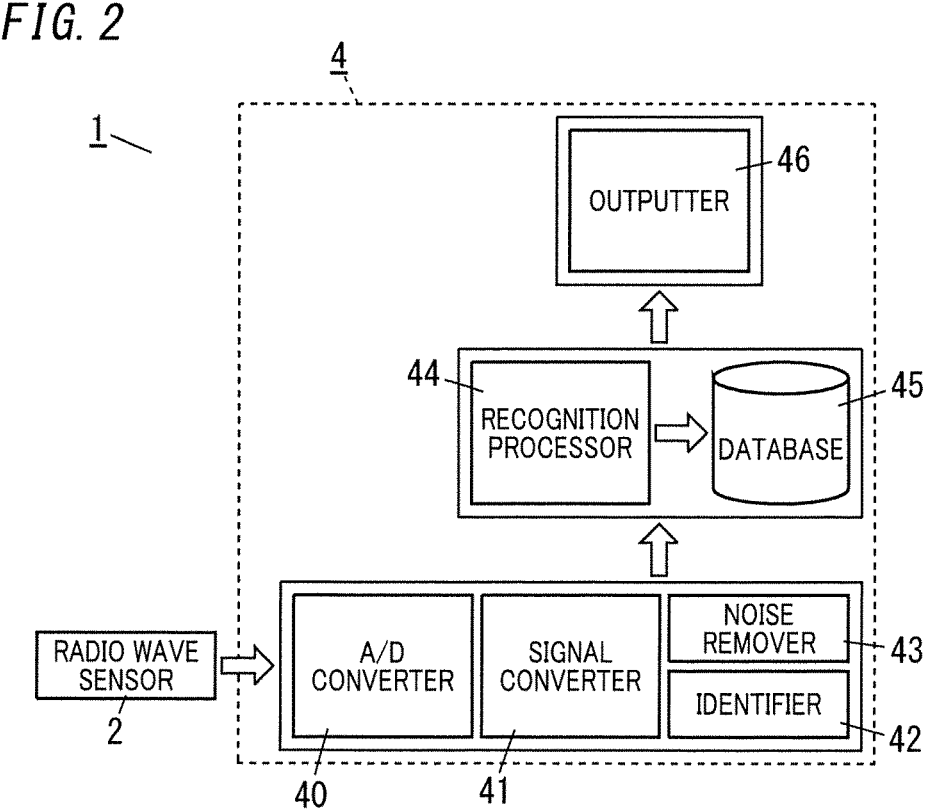
FIG. 2 is a block diagram illustrating a main part of a signal processor of the sensor device.

FIG. 2 shows, of the components of the signal processor 3, components realized by the microcontroller 4. The microcontroller 4 includes an A/D converter 40, a signal converter 41, an identifier 42, a noise remover 43, a recognition processor 44, a database 45, and an outputter 46. Note that the signal converter 41, the identifier 42, the noise remover 43, and the recognition processor 44 are realized by executing programs stored in a memory 30 (see FIG. 1). Examples of the memory 30 include rewritable non-volatile memories such as Electrically Erasable Programmable Read-Only Memories (EEPROMs) or flash memories. Note that the microcontroller 4 includes a Central Processing Unit (CPU) for executing programs stored in a memory disposed inside or outside the microcontroller 4, thereby realizing the signal converter 41, the identifier 42, the noise remover 43, and the recognition processor 44.

The A/D converter 40 samples and quantizes the first sensor signal being an analog signal and being input via the amplifier 5 and the bandpass filter 6, thereby performing A/D conversion of the first sensor signal into a first sensor signal which is digital. The A/D converter 40 is an A/D conversion circuit included in the microcontroller 4.

The signal converter 41 performs Fast Fourier Transformation (FFT) on the first sensor signal of the time domain input from the A/D converter 40, thereby converting the first sensor signal into a second sensor signal of a frequency domain. That is, the first sensor signal converted into the digital signal is converted by the FFT into the second sensor signal of the frequency domain. Note that the signal converter 41 may convert the first sensor signal into the second sensor signal by Discrete Cosine Transform (DCT).

Here, the second sensor signal is divided into frequency ranges. Each of frequency components of the frequency ranges is denoted by "s(n)." The parameter n is a natural number (for example, greater than 4) assigned in ascending order of frequency to each of the frequency ranges obtained by evenly dividing the frequency range of the second sensor signal. Moreover, s(i) is a parameter representing a frequency component in the frequency range of the number i and corresponding to the signal intensity of the second sensor signal in the frequency range. Note that the signal converter 41 preferably normalizes the frequency components s(n). In the following description, the frequency components s(n) is normalized.

The identifier 42 determines whether or not each of the frequency components s(n) is a noise component. The noise remover 43 removes, from the second sensor signal, at least one of the frequency components s(n) which is determined as the noise component by the identifier 42.

The recognition processor 44 determines the presence of a sensing target object (e.g., a person) on the basis of a distribution of the frequency components s(n) of the second sensor signal after the noise component is removed by the noise remover 43. Then, when the recognition processor 44 determines (senses) the presence of the sensing target object, the recognition processor 44 causes the outputter 46 to output the sense signal. For example, the outputter 46 may output a voltage signal which transitions to a high level in the case of the presence of the sensing target object not being determined (not being sensed) by the recognition processor 44 and transitions to a low level in the case of the presence of the sensing target object being determined (sensed) by the recognition processor 44. Note that the outputter 46 may output a voltage signal which transitions to the low level in the case of the presence of the sensing target object not being determined (not being sensed) by the recognition processor 44 and transitions to the high level in the case of the presence of the sensing target object being determined (sensed) by the recognition processor 44.

The recognition processor 44 preferably performs a pattern determination process by, for example, a principal component analysis, thereby determining the presence of the sensing target object. When the recognition processor 44 performs the pattern determination process by the principal component analysis, the recognition processor 44 preferably stores, in the database 45, data (learning sample data) of a frequency distribution of the frequency components s(n) of the second sensor signal in the case where no sensing target object is present in a sensing area of the radio wave sensor 2. Moreover, as another learning sample data, data of a frequency distribution of the frequency components s(n) of the second sensor signal corresponding to different movements of the sensing target object is stored in the database 45. The recognition processor 44 preferably compares each of the pieces of learning sample data stored in the database 45 with frequency distribution characteristics of the frequency components s(n) of the second sensor signal which is input in real time, thereby determining the presence or absence of the sensing target object. Note that the pattern determination process by the principal component analysis as described above has been known as described also in Document 1, and therefore, detailed description thereof will be omitted. Note that the recognition processor 44 may determine the presence of the sensing target object when the size of a specific frequency component s(n) among the frequency components s(n) of the second sensor signal exceeds a threshold.

Figure 3A:
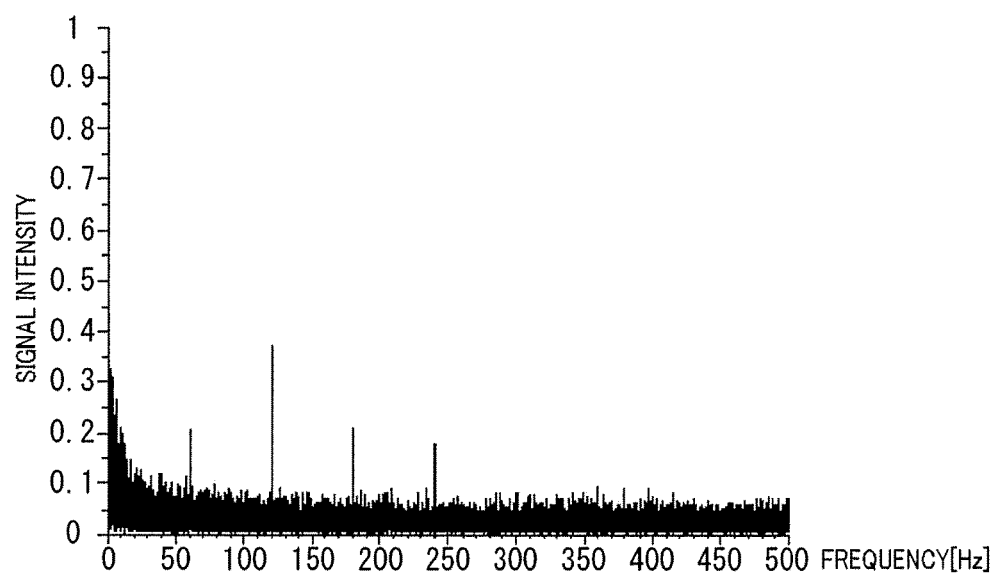
FIG. 3A is a view illustrating a frequency distribution of a second sensor signal before a power supply frequency and a noise component of a frequency of a multiplication of the power supply frequency are removed.
Figure 3B:
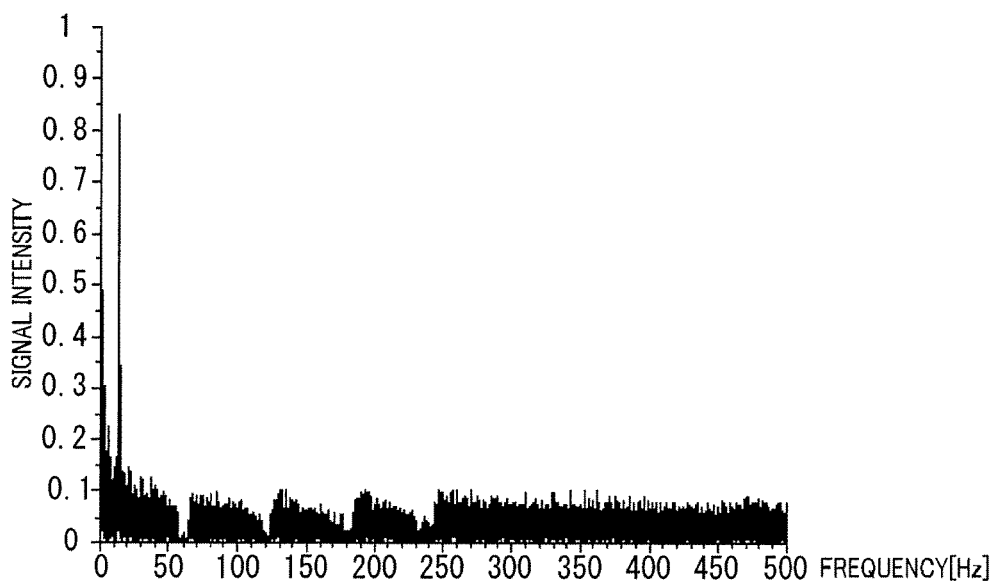
FIG. 3B is a view illustrating a frequency distribution of the second sensor signal after the power supply frequency and the noise component of the frequency of the multiplication of the power supply frequency are removed.

Next a determination process of the identifier 42 will be described. Each of FIGS. 3A and 3B shows the frequency distribution of the frequency components s(n) of the second sensor signal in the case where no sensing target object is present. Note that in FIGS. 3A and 3B, the abscissa represents the Doppler frequency and the ordinate represents the normalized signal intensity.

As illustrated in FIG. 3A, in the second sensor signal, noise is superimposed on a frequency component equal to the power supply frequency (e.g., 60 [Hz]) of a power system and frequency components equal to multiplications (120 [Hz], 180 [Hz], 240 [Hz]) of the power supply frequency. Then, noise to be superimposed on the frequency components equal to the power supply frequency of the power system and the multiplications of the power supply frequency is easily removable from the second sensor signal by using, for example, a notch filter (see FIG. 3B). However, the frequency distribution in FIG. 3B shows a very high value of the signal intensity of a frequency component located in the vicinity of about 15 [Hz]. In general, when a person is moving in the sensing area, the frequency distribution of the frequency components s(n) of the second sensor signal shows relatively high signal intensities of the frequency components s(n) within a frequency range (a frequency range from 40 [Hz] to 300 [Hz]) corresponding to the movement speed of the person. That is, the frequency distribution shown in FIG. 3B is significantly different from the frequency distribution in the case where the sensing target object (person) is present, and the peak in the vicinity of about 15 [Hz] is assumed to be noise. Note that the noise is not necessarily generated in the frequency range (frequency range in the vicinity of around 15 [Hz]) shown in FIG. 3B but may be generated in various frequency ranges in accordance with an environment in which the sensor device 1 is installed.

Therefore, the identifier 42 compares signal intensities of frequency components s(i−2), s(i−1), s(i), s(i+1), and s(i+2) with each other. Then, when the signal intensity of the frequency component s(i) is higher than the signal intensities of some other frequency components s(i−2), s(i−1), s(i+1), and s(i+2) by an extent exceeding a threshold range, the identifier 42 determines the frequency component s(i) as the noise component. In other words, when the signal intensity of the frequency component s(i) is higher than a threshold, the identifier 42 determines the frequency component s(i) as the noise component. The threshold is a value based on the signal intensities of some other frequency components s(i−2), s(i−1), s(i+1), and s(i+2). Specifically, when (the signal intensity of) the frequency component s(i) satisfies the following inequality expression, the identifier 42 determines the frequency component s(i) as the noise component, whereas when the frequency component s(i) fails to satisfy the following inequality expression, the identifier 42 does not determine the frequency component s(i) as the noise component. The right side of the following inequality expression represents the threshold.

$$s(i) > \alpha \times \{s(i-2) + s(i-1) + s(i+1) + s(i+2)\}$$

Here, the value of a coefficient α for weighting is preferably greater than 1 but may be less than 1. Moreover, the coefficient α may be a fixed value or may be varied. For example, in the case of determination (sensing) of long-term presence of a sensing target (person) by the recognition processor 44, such sensing is highly probably erroneous due to the noise component, and therefore, the identifier 42 may reduce the value of the coefficient α. Note that the identifier 42 may vary the value of the coefficient α when the radio wave sensor 2 starts transmitting a radio wave or while the radio wave sensor 2 is transmitting the radio wave.

Figure 4:
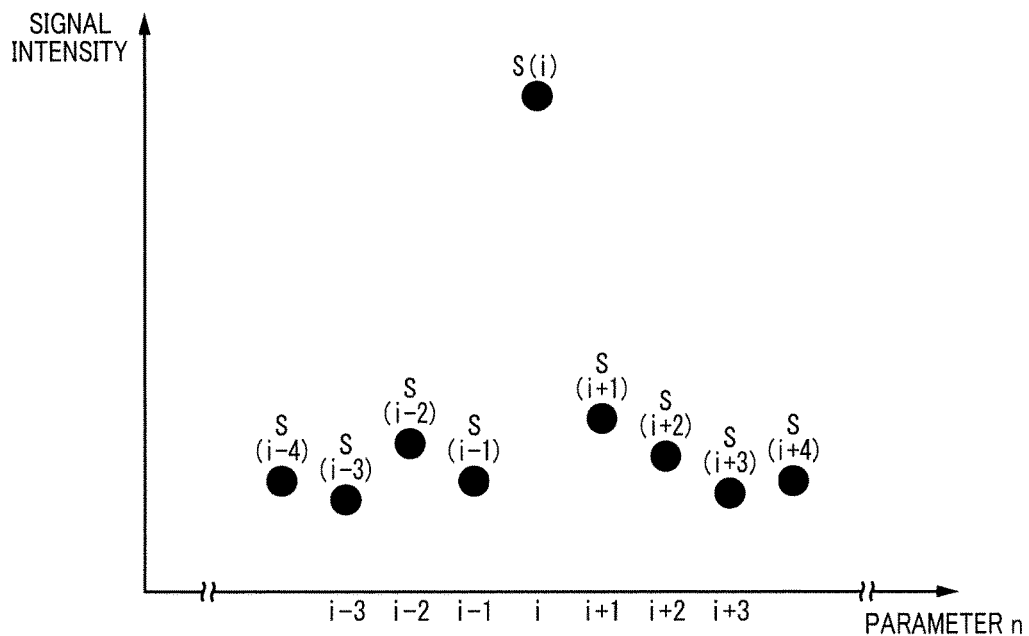
FIG. 4 is a view illustrating a frequency distribution in a case where some frequency components of the second sensor signal include noise components.
Figure 5:
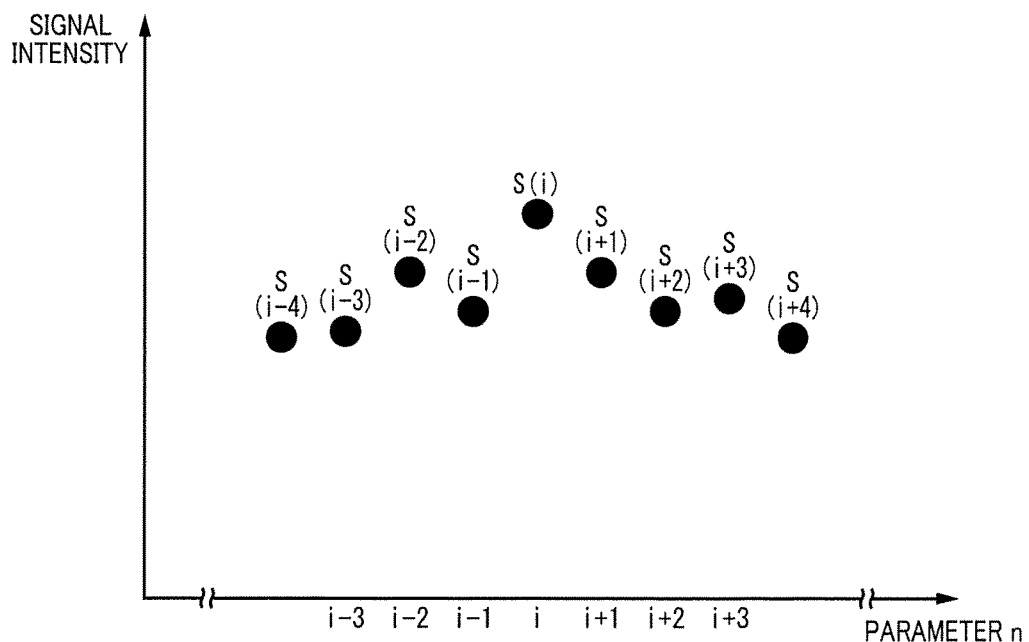
FIG. 5 is a view illustrating a frequency distribution in a case where some frequency components of the second sensor signal include no noise component.

For example, it is assumed that the frequency components s(n) of the second sensor signal are distributed as shown in a frequency distribution of FIG. 4. The identifier 42 determines whether or not each of the frequency components s(n) satisfies the inequality expression. Since the frequency component s(i) of the number i satisfies the inequality expression, the identifier 42 determines the frequency component s(i) of the number i as the noise component. However, when the frequency components s(n) of the second sensor signal are distributed as shown in a frequency distribution of FIG. 5, the frequency component s(i) of the number i fails to satisfy the inequality expression. Therefore, the identifier 42 does not determine the frequency component s(i) of the number i as the noise component. Then, the identifier 42 transfers determination results of the all the frequency components s(n) to the noise remover 43.

Figure 6A:
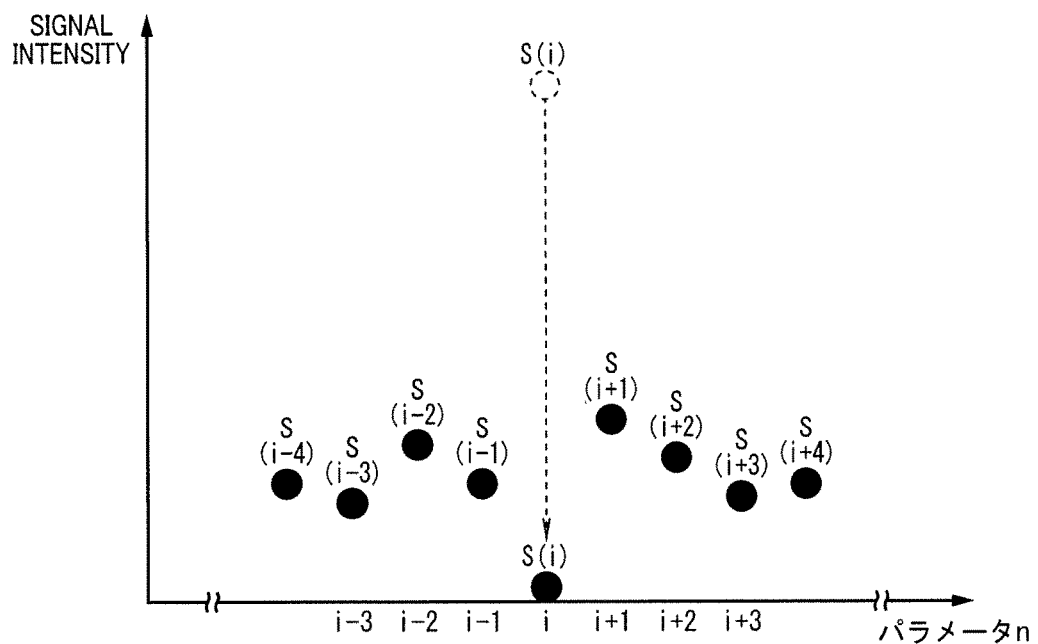
FIG. 6A is a view illustrating a frequency distribution of some frequency components of the second sensor signal in a case where the noise components are set to zero.

The noise remover 43 preferably sets the signal intensity of the frequency component s(i) which is determined as the noise component by the identifier 42 to zero (see FIG. 6A). In FIG. 6A, a void circle drawn by a broken line represents the frequency component s(i) before noise is removed by the noise remover 43, and black dots represent the frequency components s(i) after the noise is removed by the noise remover 43.

Figure 6B:
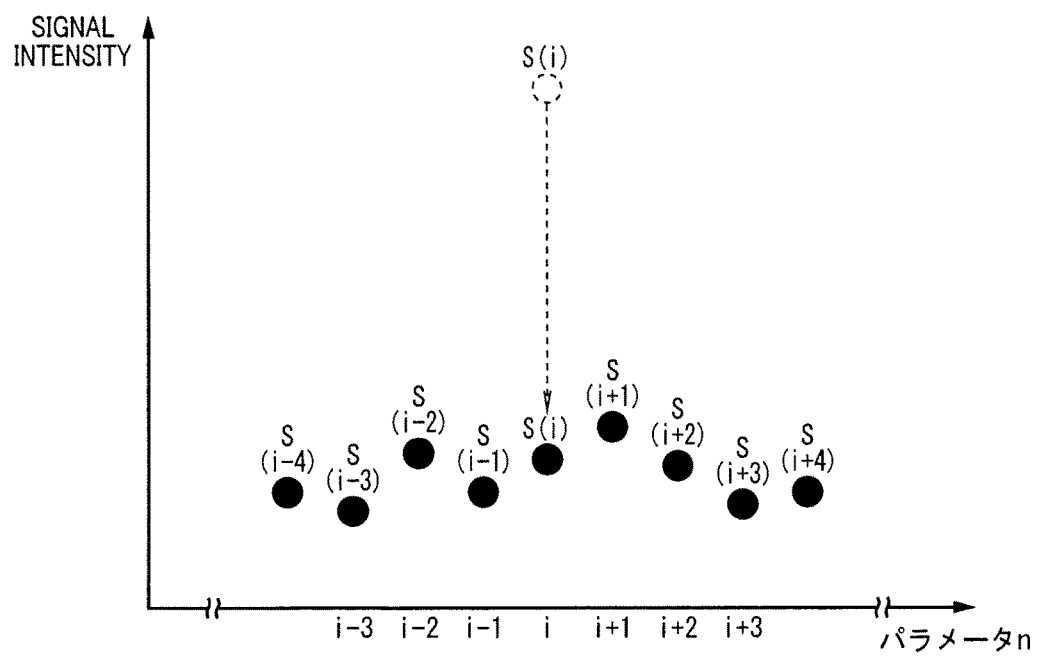
FIG. 6B is a view illustrating a frequency distribution of some frequency components of the second sensor signal in a case where the noise component is set to an interpolated value.

Alternatively, the noise remover 43 may set the signal intensity of the frequency component s(i) determined as the noise component to a value interpolated with the signal intensities of the some other frequency components s(i−2), s(i−1), s(i+1), and s(i+2) located in the vicinity of the frequency component s(i). For example, the noise remover 43 preferably sets the signal intensity of the frequency component s(i) to an average value of signal intensities of the frequency component s(i−1) located immediately before the frequency component s(i) and the frequency components s(i+1) located immediately after the frequency component s(i) (see FIG. 6B). In FIG. 6B, a void circle drawn by a broken line represents the frequency component s(i) before noise is removed by the noise remover 43, and black dots represent the frequency components s(i) after the noise is removed by the noise remover 43. Alternatively, the noise remover 43 may set the signal intensity of the frequency component s(i) to an average value of signal intensities of each two of frequency components s(i−2), s(i−1), s(i+1), and s(i+2) preceding and following the frequency component s(i).

The recognition processor 44 performs a pattern determination process (alternatively, a comparison process with a threshold) on the second sensor signal after the noise component is removed by the noise remover 43. Therefore, in the sensor device 1, the sensing accuracy of the sensing target object can be improved as compared to a case where the recognition processor 44 performs the pattern determination process on the second sensor signal from which the noise component is not removed by the noise remover 43. Besides, the identifier 42 determines whether or not the frequency component s(i) is a noise component by a simple process of comparing the signal intensity of the frequency component s(i) with the signal intensities of the some other frequency components s(i−2), s(i−1), s(i+1), and s(i+2) located in the vicinity of the frequency component s(i). As a result, the sensor device 1 can simplify the signal processing by the signal processor 3 as compared to the known example described in Document 1. Moreover, simplifying the signal processing allows the sensor device 1 to perform the determination process of the sensing target object by the recognition processor 44 concurrently with the determination process of the noise component by the identifier 42 and the removal process of the noise component by the noise remover 43. As a result, the sensor device 1 does not have to interrupt sensing of the sensing target object in order to remove the noise component and can thus improve the convenience.

Here, the movement speed of an object at a Doppler frequency of 500 [Hz] is about 11 [km/h]. However, in general, the speed at which a person goes up or down stairs is considered to be lower than the speed at which the person walks on a flat ground (about 5-6 [km/h]). Therefore, when the sensing target object of the sensor device 1 is a person who goes up or down stairs, the pattern determination process of the recognition processor 44 requires no frequency component s(n) in a frequency range higher than about 300 [Hz] among the frequency components s(n) of the second sensor signal. Thus, the identifier 42 preferably performs the determination process of the noise component only on the frequency components s(n) in the frequency range including the Doppler frequency corresponding to the movement speed of the sensing target object. Moreover, when a frequency range in which the noise component may occur is known, the identifier 42 preferably performs the determination process on the frequency range (determination frequency range) which is known. For example, a specific vibration frequency of a structure (e.g., a lighting fixture 8, and the like which will be described later) to which the sensor device 1 is to be attached is known, the identifier 42 preferably performs the determination process on a frequency range (determination frequency range) including the specific vibration frequency. As described above, narrowing the frequency range subjected to the determination process of the noise component by the identifier 42 enables a reduction in process amount of the signal processing by the signal processor 3. The sensor device 1 reduces the process amount of the signal processing by the signal processor 3, thereby reducing time required for sensing the sensing target object.

Here, in the determination process of the noise component by the identifier 42, the number of some other frequency components s(n) whose signal intensities are compared with the signal intensity of the frequency component s(i) is not limited to four, but may be two or six or more. Moreover, the number of some other frequency components s(n) in a frequency range higher than the frequency range (n=i) of the frequency component s(i) does not have to be equal to the number of some other frequency components s(n) in a frequency range lower than the frequency range (n=i) of the frequency component s(i). The number of frequency components s(n) may be different between the frequency range higher than the frequency range (n=i) of the frequency component s(i) and the frequency range lower than the frequency range (n=i) of the frequency component s(i). Note that, in the sensor device 1, the setting of the number of frequency components as described above is written in a program executed by the CPU of the microcontroller 4. Thus, in the sensor device 1, in order to change the setting of the number of frequency components as described above, the program has to be modified. Alternatively, the signal processor 3 may be provided with an input device such as a dip switch, and the sensor device 1 may be configured such that the setting of the number of frequency components as described above is input to the microcontroller 4 by the input device.

Figure 7:
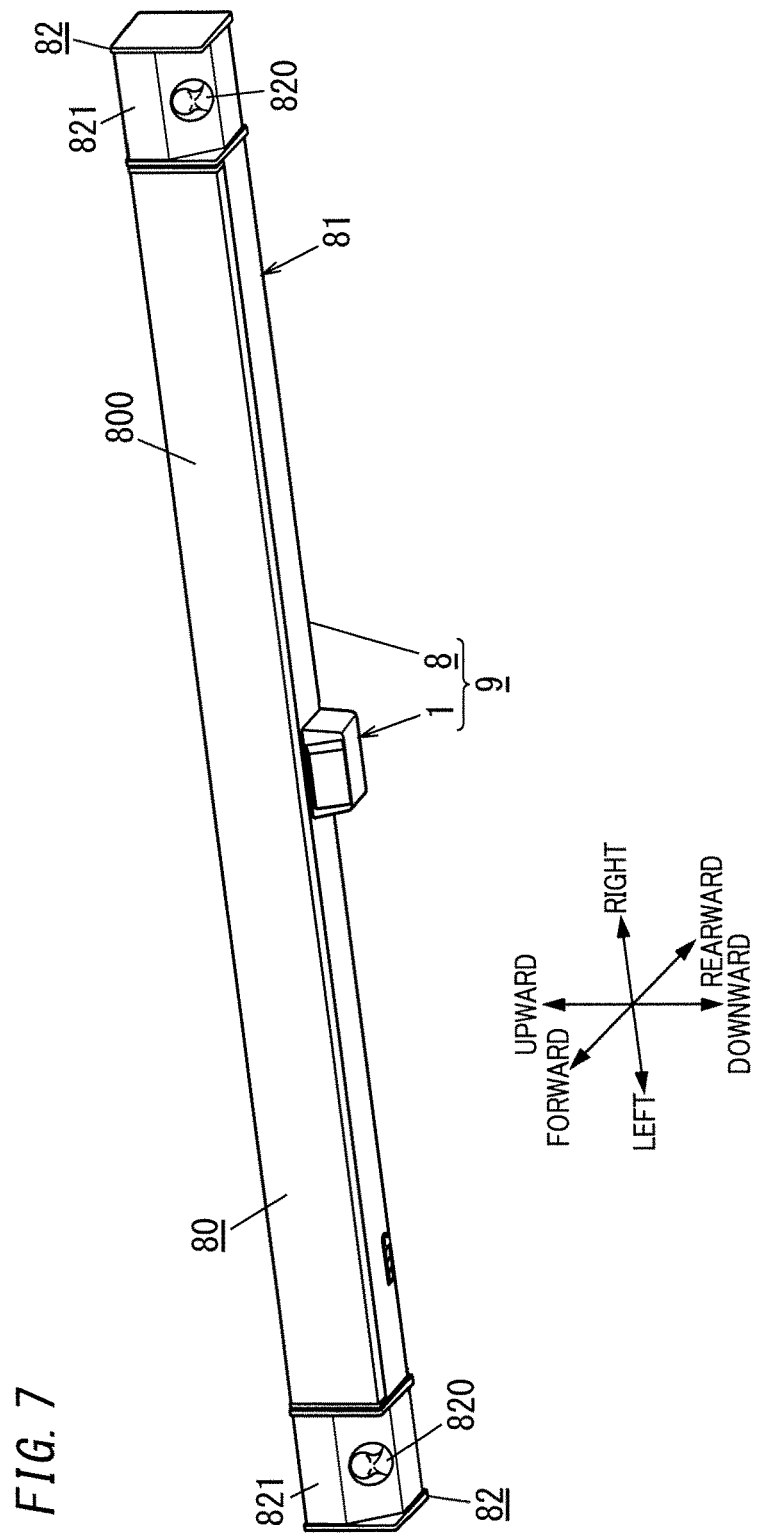
FIG. 7 is a perspective view illustrating a lighting device according to one embodiment of the present disclosure.

Next, a lighting device 9 of the present embodiment will be described. As illustrated in FIG. 7, the lighting device 9 includes the sensor device 1 and the lighting fixture 8. Note that in the following description, the forward and rearward direction, the right and left direction, and the upward and downward direction of the lighting device 9 are defined as shown in FIG. 7. The lighting fixture 8 is a stair passage guide light installed on a wall of a landing of stairs which will be an evacuation path of a building. The lighting fixture 8 includes a first light source unit 80 for regular lighting, two second light source units 82 for emergency lighting, and an apparatus body 81. Moreover, the lighting fixture 8 preferably includes an emergency power supply unit, a battery unit, and a control unit.

The apparatus body 81 is made of a metal plate to have a square gutter shape. The first light source unit 80 is detachably attached to the apparatus body 81 so as to close an opening in a front surface of the apparatus body 81. The two second light source units 82 are attached on opposite ends in the longitudinal direction of the apparatus body 81. The emergency power supply unit, the battery unit, and the control unit are accommodated in the apparatus body 81.

The first light source unit 80 preferably includes an LED module serving as a light source, an attachment member to which the LED module is attached, a cover 800 which is attached to the attachment member so as to cover the LED module, and a power supply unit. The power supply unit preferably includes a power conversion circuit configured to convert alternative-current power supplied from a power system into direct current power and a control circuit configured to control the power conversion circuit to increase or reduce (dim) luminous flux output from the LED module.

Each of the two second light source units 82 preferably includes a light emitting diode (LED), a lens 820 configured to control the orientation of the luminous flux output from the LED, and a body 821 accommodating the LED and the lens 820. Note that the lens 820 is exposed from a front surface of the body 821. In case of power failure of the power system, electric power supplied from the battery unit causes the emergency power supply unit to turn on the two second light source units 82 for the emergency lighting.

The sensor device 1 is attached to the center of a lower surface of the apparatus body 81 in a longitudinal direction of the apparatus body 81. The sensor device 1 transmits a radio wave forward with respect to the lighting fixture 8, and upon sensing a person going up or down stairs, the sensor device 1 outputs a sense signal. The sense signal output from the sensor device 1 is input to the control circuit of the power supply unit of the first light source unit 80. When the control circuit receives the sense signal, the control circuit controls the power conversion circuit to cause rated lighting of the LED module. Moreover, when the control circuit does not receive the sense signal, the control circuit controls the power conversion circuit to cause dimmed lighting of the LED module (lighting with luminous flux lower than the luminous flux of the rated lighting). Note that the sensor device 1 may sense opening or closing of a door when a person comes into or goes out of the space of the stairs so as to output the sense signal.

Note that the lighting fixture included in the lighting device 9 is not limited to the lighting fixture 8 of the present embodiment, i.e., the stair passage guide light. For example, the lighting device may include a lighting fixture such as a street lamp installed in, for example, a park or roadway lighting equipment used to illuminate roads and the sensor device 1. The sensor device 1 does not have to be attached to the apparatus body 81. For example, when the lighting fixture is the street lamp or the roadway lighting equipment, the sensor device 1 may be attached to a pole to which the lighting fixture is attached.

As described above, a sensor device 1 of a first aspect includes a radio wave sensor 2 configured to transmit a radio wave and to receive a reflection wave which is the radio wave reflected off and returning from an object, and to output a sensor signal containing frequency components proportional to a movement speed of the object. The sensor device 1 further includes a signal processor 3 configured to perform signal processing on the sensor signal output from the radio wave sensor 2 and to determine whether or not the object is a sensing target object. The signal processor 3 includes a signal converter 41 configured to convert the sensor signal which is a first sensor signal of a time domain into a second sensor signal of a frequency domain. The signal processor 3 includes a recognition processor 44 configured to determine whether or not the object is the sensing target object based on a distribution of signal intensities showing magnitudes of frequency components s(n) of the second sensor signal. The signal processor 3 includes an identifier 42 configured to determine whether or not each of the frequency components s(n) is a noise component and a noise remover 43 configured to remove, from the second sensor signal, at least one of the frequency components s(n) which is determined as the noise component by the identifier 42. The identifier 42 compares a signal intensity of each of the frequency components s(n) of the second sensor signal with one or more signal intensities of other frequency components of the second sensor signal. When a signal intensity of at least one frequency component s(i) of the frequency components is greater than signal intensities of one or more vicinity frequency components s(i−2), s(i−1), s(i+1), and s(i+2) which are located in a vicinity of the at least one frequency component s(i) by an extent exceeding a threshold range, the identifier 42 determines the at least one frequency component s(i) as the noise component.

The sensor device 1 of the first aspect enables simplification of the signal processing by the signal processor 3 by removing the noise component to improve the sensing accuracy of the sensing target object while determining whether or not the at least one frequency component s(i) is the noise component by simple processing.

Moreover, a sensor device 1 of a second aspect can be realized in combination with the sensor device 1 of the first aspect. In the sensor device 1 of the second aspect, the identifier 42 preferably determines whether or not each of the frequency components is a noise component within a predetermined frequency range.

The sensor device 1 of the second aspect enables narrowing of a frequency range on which the identifier 42 performs the determination process of the noise component and reducing of the process amount of the signal processing by the signal processor 3.

Moreover, a sensor device 1 of a third aspect can be realized in combination with the sensor device 1 of the second aspect. In the sensor device 1 of the second aspect, the identifier 42 preferably changes a total number of the vicinity frequency components s(i−1), . . . located in the vicinity of the at least one frequency component s(i).

The sensor device 1 of the third aspect enables determination of the noise component from the frequency components s(i−1), . . . of an appropriate frequency range according to, for example, features of the noise component.

Moreover, a sensor device 1 of a fourth aspect can be realized in combination with the sensor device 1 of any one of the first to third aspects. In the sensor device 1 of the fourth aspect, the noise remover 43 is preferably configured to remove the noise component by setting the signal intensity of the at least one frequency component s(i) determined as the noise component by the identifier 42 to zero.

The sensor device 1 of the fourth aspect enables a reduction in influence of the noise component over the determination process performed by the identifier 42.

Moreover, a sensor device 1 of a fifth aspect can be realized in combination with the sensor device 1 of any one of the first to third aspects. In the sensor device 1 of the fifth aspect, the noise remover 43 is preferably configured to remove the noise component by setting the signal intensity s(i) of the at least one frequency component determined as the noise component by the identifier 42 to a value interpolated with two or more of the signal intensities of the vicinity frequency components located in the vicinity of the at least one frequency component s(i).

The sensor device 1 of the fifth aspect enables a reduction in influence of the noise component over the determination process performed by the identifier 42.

As described above, a lighting device 9 of a sixth aspect includes the sensor device 1 of any one of the first to fifth aspects and a lighting fixture 8. A lit state of the lighting fixture 8 changes in accordance with a sensing result of the sensing target object by the sensor device 1.

When the lighting device 9 of the sixth aspect enables a reduction in energy consumed by the lighting fixture 8, for example, when the lighting fixture 8 is in an OFF state (or in a dimmed state) when no person is present and the lighting fixture 8 is in an ON state when a person is present.

As described above, a sensor device 1 of a seventh aspect includes a radio wave sensor 2 configured to transmit a radio wave and to receive a reflection wave which is the radio wave reflected off and returning from an object, and to output a sensor signal containing frequency components proportional to a movement speed of the object. Moreover, the sensor device 1 includes a signal processor 3; and a memory (30) storing a program. The program, when executed by the signal processor 3, causes the signal processor 3 to perform: converting the sensor signal which is a first sensor signal of a time domain into a second sensor signal of a frequency domain; determining whether or not the object is a sensing target object based on a distribution of signal intensities showing magnitudes of frequency components s(n) of the second sensor signal; determining whether or not each of the frequency components s(n) of the second sensor signal is a noise component by comparing a signal intensity of at least one frequency component s(i) of the second sensor signal with a value calculated from the signal intensities of one or more vicinity frequency components s(i−2), s(i−1), s(i+1), and s(i+2) of the second sensor signal, the one or more vicinity frequency components s(i−2), s(i−1), s(i+1), and s(i+2) being located in a vicinity of the at least one frequency component s(i); and removing, from the second sensor signal, one or more of the frequency components s(n) which is determined as the noise component.

The sensor device 1 of the seventh aspect enables simplification of the signal processing by the signal processor 3 by removing the noise component to improve the sensing accuracy of the sensing target object while determining whether or not the one frequency component s(i) is the noise component by simple processing.

A sensor device 1 of an eighth aspect can be realized in combination with the sensor device 1 of the seventh aspect. In the sensor device 1 of the eighth aspect, the program, when executed by the signal processor 3, preferably causes the signal processor 3 to perform determining whether or not each of the frequency components s(n) is a noise component within a predetermined frequency range.

The sensor device 1 of the eighth aspect enables narrowing of a frequency range on which the signal processor 3 performs the determination process of the noise component and reducing of the process amount of the signal processing by the signal processor 3.

Moreover, a sensor device 1 of a ninth aspect can be realized in combination with the sensor device 1 of the seventh aspect or the eighth aspect. In the sensor device 1 of the ninth aspect, the program, when executed by the signal processor 3, preferably causes the signal processor 3 to perform changing a total number of the vicinity frequency components s(i−1), . . . located in the vicinity of the at least one frequency component s(i).

The sensor device 1 of the ninth aspect enables determination of the noise component from the frequency components s(i−1), . . . of an appropriate frequency range according to, for example, features of the noise component.

Moreover, a sensor device 1 of a tenth aspect can be realized in combination with the sensor device 1 of any one of the seventh to ninth aspects. In the sensor device 1 of the tenth aspect, the program, when executed by the signal processor 3, preferably causes the signal processor 3 to perform removing the noise component by setting the signal intensity of the frequency component s(i) determined as the noise component to zero.

The sensor device 1 of the tenth aspect enables a reduction in influence of the noise component over the determination process performed by the signal processor 3.

Moreover, a sensor device 1 of an eleventh aspect can be realized in combination with the sensor device 1 of any one of the seventh to ninth aspects. In the sensor device 1 of the eleventh aspect, the program, when executed by the signal processor 3, preferably causes the signal processor 3 to perform removing the noise component by setting the signal intensity of the frequency component s(i) determined as the noise component to a value interpolated with two or more of the signal intensities of the vicinity frequency components located in the vicinity of the frequency component.

The sensor device 1 of the eleventh aspect enables a reduction in influence of the noise component over the determination process performed by the signal processor 3.

As described above, a lighting device 9 of a twelfth aspect includes: the sensor device 1 according to any one of the seventh to eleventh aspects; and a lighting fixture 8. A lit state of the lighting fixture 8 changes in accordance with a sensing result of the sensing target object by the sensor device 1.

When the lighting device 9 of the twelfth aspect enables a reduction in energy consumed by the lighting fixture 8, for example, when the lighting fixture 8 is in an OFF state (or in a dimmed state) when no person is present and the lighting fixture 8 is in an ON state when a person is present.

As described above, a sensor device 1 of the thirteenth aspect includes a radio wave sensor 2 configured to transmit a radio wave and to receive a reflection wave which is the radio wave reflected off and returning from an object, and to output a sensor signal containing frequency components proportional to a movement speed of the object. Moreover, the sensor device 1 includes a signal processor 3. The signal processor 3 is configured to convert the sensor signal which is a first sensor signal of a time domain into a second sensor signal of a frequency domain. The signal processor 3 is configured to determine whether or not the object is a sensing target object based on a distribution of signal intensities showing magnitudes of frequency components s(n) of the second sensor signal. The signal processor 3 is configured to determine whether or not each of the frequency components s(n) of the second sensor signal is a noise component by comparing a signal intensity of at least one frequency component s(i) of the second sensor signal with a value calculated from the signal intensities of one or more vicinity frequency components s(i−2), s(i−1), s(i+1), and s(i+2) of the second sensor signal, the one or more vicinity frequency components s(i−2), s(i−1), s(i+1), and s(i+2) being located in a vicinity of the at least one frequency component. The signal processor 3 is configured to remove, from the second sensor signal, one or more of the frequency components s(n) which is determined as the noise component.

The sensor device 1 of the thirteenth aspect enables simplification of the signal processing by the signal processor 3 by removing the noise component to improve the sensing accuracy of the sensing target object while determining whether or not the one frequency component s(i) is the noise component by simple processing.

Moreover, a sensor device 1 of a fourteenth aspect can be realized in combination with the sensor device 1 of the thirteenth aspect. In the sensor device 1 of the fourteenth aspect, the signal processor 3 is preferably configured to determine whether or not each of the frequency components s(n) is a noise component within a predetermined frequency range.

The sensor device 1 of the fourteenth aspect enables narrowing of a frequency range on which the signal processor 3 performs the determination process of the noise component and reducing of the process amount of the signal processing by the signal processor 3.

Moreover, a sensor device 1 of a fifteenth aspect can be realized in combination with the sensor device 1 of the thirteenth aspect or the fourteenth aspect. In the sensor device 1 of the fifteenth aspect, the signal processor 3 is preferably configured to change a total number of the vicinity frequency components s(i−1), . . . located in the vicinity of the frequency component s(i).

The sensor device 1 of the fifteenth aspect enables determination of the noise component from the frequency components s(i−1), . . . of an appropriate frequency range according to, for example, features of the noise component.

A sensor device 1 of a sixteenth aspect can be realized in combination with the sensor device 1 of any one of the thirteenth to fifteenth aspects. In the sensor device 1 of the sixteenth aspect, the signal processor 3 is preferably configured to remove the noise component by setting the signal intensity of the frequency component s(i) determined as the noise component to zero.

The sensor device 1 of the sixteenth aspect enables a reduction in influence of the noise component over the determination process performed by the signal processor 3.

A sensor device 1 of a seventeenth aspect can be realized in combination with the sensor device 1 of any one of the thirteenth to fifteenth aspects. In the sensor device 1 of the seventeenth aspect, the signal processor 3 is preferably configured to remove the noise component by setting the signal intensity of the frequency component s(i) determined as the noise component to a value interpolated with two or more of the signal intensities of the vicinity frequency components located in the vicinity of the frequency component.

The sensor device 1 of the seventeenth aspect enables a reduction in influence of the noise component over the determination process performed by the signal processor 3.

As described above, a lighting device 9 of an eighteenth aspect includes the sensor device 1 according to any one of the thirteenth to seventeenth aspects; and a lighting fixture 8. A lit state of the lighting fixture 8 changes in accordance with a sensing result of the sensing target object by the sensor device 1.

When the lighting device 9 of the eighteenth aspect enables a reduction in energy consumed by the lighting fixture 8, for example, when the lighting fixture 8 is in an OFF state (or in a dimmed state) when no person is present and the lighting fixture 8 is in an ON state when a person is present.

Note that the electrical device which is combined with the sensor device 1 is not limited to the lighting fixture. For example, the sensor device 1 may be combined with an automatic door which opens or closes on the basis of the sensing result of the sensor device 1.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A sensor device, comprising:
a radio wave sensor configured to transmit a radio wave and to receive a reflection wave which is the radio wave reflected off and returning from an object, and to output a sensor signal containing frequency components proportional to a movement speed of the object; and
a signal processor configured to perform signal processing on the sensor signal output from the radio wave sensor and to determine whether or not the object is a sensing target object,
the signal processor including:
a signal converter configured to convert the sensor signal which is a first sensor signal of a time domain into a second sensor signal of a frequency domain,
a recognition processor configured to determine whether or not the object is the sensing target object based on a distribution of signal intensities showing magnitudes of frequency components of the second sensor signal,
an identifier configured to determine whether or not each of the frequency components is a noise component, and
a noise remover configured to remove, from the second sensor signal, at least one of the frequency components which is determined as the noise component by the identifier, and
the identifier comparing a signal intensity of each of the frequency components of the second sensor signal with one or more signal intensities of other frequency components of the second sensor signal, and
when a signal intensity of at least one frequency component of the frequency components is greater than signal intensities of one or more vicinity frequency components which are located in a vicinity of the at least one frequency component by an extent exceeding a threshold range, the identifier determining the at least one frequency component as the noise component.

2. The sensor device according to claim 1, wherein the identifier determines whether or not each of the frequency components is a noise component within a predetermined frequency range.

3. The sensor device according to claim 1, wherein the identifier changes a total number of the vicinity frequency components located in the vicinity of the at least one frequency component.

4. The sensor device according to claim 1, wherein the noise remover is configured to remove the noise component by setting the signal intensity of the at least one frequency component determined as the noise component by the identifier to zero.

5. The sensor device according to claim 1, wherein the noise remover is configured to remove the noise component by setting the signal intensity of the at least one frequency component determined as the noise component by the identifier to a value interpolated with two or more of the signal intensities of the vicinity frequency components located in the vicinity of the at least one frequency component.

6. A lighting device, comprising:
the sensor device according to claim 1; and
a lighting fixture,
a lit state of the lighting fixture changing in accordance with a sensing result of the sensing target object by the sensor device.

7. A sensor device, comprising:
a radio wave sensor configured to transmit a radio wave and to receive a reflection wave which is the radio wave reflected off and returning from an object, and to output a sensor signal containing frequency components proportional to a movement speed of the object;
a signal processor; and
a non-transitory memory storing a program,
wherein the program, when executed by the signal processor, causes the signal processor to perform:
converting the sensor signal which is a first sensor signal of a time domain into a second sensor signal of a frequency domain;
determining whether or not the object is a sensing target object based on a distribution of signal intensities showing magnitudes of frequency components of the second sensor signal;
determining whether or not each of the frequency components of the second sensor signal is a noise component by comparing a signal intensity of at least one frequency component of the second sensor signal with a value calculated from the signal intensities of one or more vicinity frequency components of the second sensor signal, the one or more vicinity frequency components being located in a vicinity of the at least one frequency component; and
removing, from the second sensor signal, one or more of the frequency components which is determined as the noise component.

8. The sensor device according to claim 7, wherein the program, when executed by the signal processor, causes the signal processor to perform determining whether or not each of the frequency components is a noise component within a predetermined frequency range.

9. The sensor device according to claim 7, wherein the program, when executed by the signal processor, causes the signal processor to perform changing a total number of the vicinity frequency components located in the vicinity of the at least one frequency component.

10. The sensor device according to claim 7, wherein the program, when executed by the signal processor, causes the signal processor to perform removing the noise component by setting the signal intensity of the frequency component determined as the noise component to zero.

11. The sensor device according to claim 7, wherein the program, when executed by the signal processor, causes the signal processor to perform removing the noise component by setting the signal intensity of the frequency component determined as the noise component to a value interpolated with two or more of the signal intensities of the vicinity frequency components located in the vicinity of the frequency component.

12. A lighting device, comprising:
the sensor device according to claim 7; and
a lighting fixture,
a lit state of the lighting fixture changing in accordance with a sensing result of the sensing target object by the sensor device.

13. A sensor device, comprising:
a radio wave sensor configured to transmit a radio wave and to receive a reflection wave which is the radio wave reflected off and returning from an object, and to output a sensor signal containing frequency components proportional to a movement speed of the object; and
a signal processor configured to:

convert the sensor signal which is a first sensor signal of a time domain into a second sensor signal of a frequency domain;

determine whether or not the object is a sensing target object based on a distribution of signal intensities showing magnitudes of frequency components of the second sensor signal;

determine whether or not each of the frequency components of the second sensor signal is a noise component by comparing a signal intensity of at least one frequency component of the second sensor signal with a value calculated from the signal intensities of one or more vicinity frequency components of the second sensor signal, the one or more vicinity frequency components being located in a vicinity of the at least one frequency component; and remove, from the second sensor signal, one or more of the frequency components which is determined as the noise component.

14. The sensor device according to claim 13, wherein the signal processor is configured to determine whether or not each of the frequency components is a noise component within a predetermined frequency range.

15. The sensor device according to claim 13, wherein the signal processor is configured to change a total number of the vicinity frequency components located in the vicinity of the frequency component.

16. The sensor device, according to claim 13, wherein the signal processor is configured to remove the noise component by setting the signal intensity of the frequency component determined as the noise component to zero.

17. The sensor device according to claim 13, wherein the signal processor is configured to remove the noise component by setting the signal intensity of the frequency component determined as the noise component to a value interpolated with two or more of the signal intensities of the vicinity frequency components located in the vicinity of the frequency component.

18. A lighting device, comprising:
the sensor device according to claim 13; and
a lighting fixture,
a lit state of the lighting fixture changing in accordance with a sensing result of the sensing target object by the sensor device.

* * * * *